Sept. 6, 1927.
O. G. HALLIBURTON
SHOCK ABSORBER
Filed Feb. 2, 1925
1,641,268
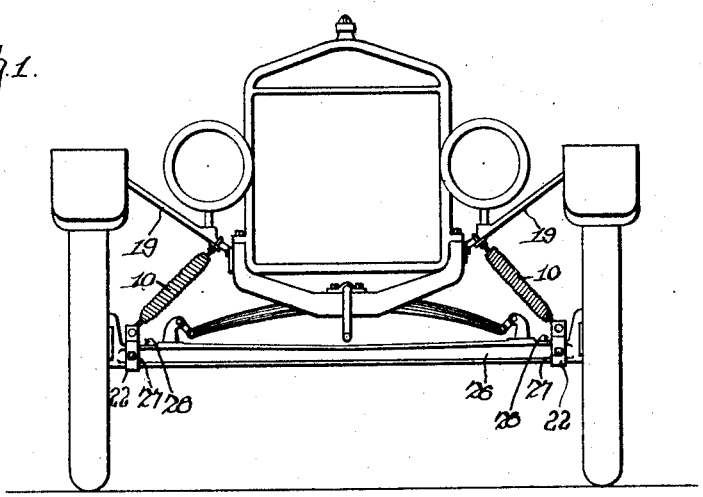
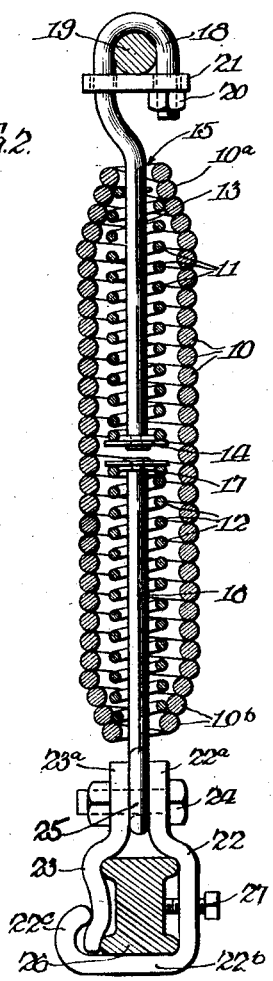
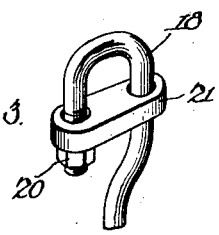
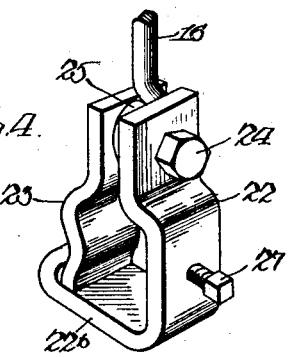
Inventor
Orville G. Halliburton
By Luther Johns, Atty.

Patented Sept. 6, 1927.

1,641,268

UNITED STATES PATENT OFFICE.

ORVILLE G. HALLIBURTON, OF CHICAGO, ILLINOIS.

SHOCK ABSORBER.

Application filed February 2, 1925. Serial No. 6,195.

These improvements relate to means for overcoming or reducing vibration. The prime object is to provide a device which will satisfactorily reduce the shocks of vibration in automobiles, with special reference to the well-known "Ford" automobile and others to which this type of absorber may be applied; and to gain the desired results through means which are simple, strong, durable, cheap in manufacture, and which may easily be applied for effective use.

In the drawings Figure 1 is a front view of a fragment of a Ford automobile equipped with shock absorbers embodying the present invention; Fig. 2 is an enlarged medial longitudinal section through the spring elements and the automobile parts to which the device is secured; and Figs. 3 and 4 are perspective details of the upper and lower holding members respectively.

Referring to Fig. 2, there is an outer or external coiled expansion spring 10 formed of strong spring steel wire which, in my practice, has a diameter of approximately three-sixteenths of an inch, the spring being approximately seven and one-half inches in length and of an outside diameter of approximately one and one-half inches.

Housed by the external spring is an internal compression spring 11 occupying about half of the length of the external spring, and there is preferably also another internal compression spring 12 extending through substantially the other half of the external spring. The wire of these internal springs in my practice has a diameter of approximately one-eighth of an inch and is of strong spring steel.

An axially arranged pull rod 13 is provided at its inner end with means shown as a head or washer 14 for communicating pull strains to the inner end of the internal spring 11. The external spring is formed at its end portion 10ª to receive from the outer end of the internal spring the pull strains communicated to that spring from the rod 13. A cheap and convenient way to form a stop for the internal spring is successively reducing the diameter of the coils of the spring 10 to provide a restricted opening at 15 of such diameter that the internal spring 11 is held against issuing through and beyond the outer spring. The spring 10 is similarly formed at its other end, at 10ᵇ, to receive the strains of the similar pull rod 16, having a head 17 engaging the inner end of the internal spring 12.

The upper end of the rod 13 is shown as being formed with a hook 18 adapted to engage a part on the automobile body, as the brace 19 of the Ford automobile. The free end of the hook is threaded for the nut 20, and the apertured bar 21 held on both arms of the hook as shown, when held by the nut serves to make a tight and non-rattling connection between the parts, and one easy to attach.

The lower holding device comprises two clamping members 22 and 23 and a bolt 24 passing through apertures in the flat and facing portions 22ª and 23ª, the bolt also passing through the ring 25 turned on the end of the rod 16 and positioned between the clamping members. The lower side portions of these members flare outwardly and downwardly to provide an internal space for the axle as 26 of the automobile, and the member 22 is formed with a bottom or transversely-extending part 22ᵇ on which the axle rests, the free end of this part 22ᵇ being turned upward and inward to form the lip 22ᶜ engaging the side wall of the clamping member 23, and the member 23 is preferably formed with an indentation to receive the lip 22ᶜ. A set screw 27 passes preferably through the side wall of the member 22 so as to engage the axle with such effect as to pull the lip 22ᶜ into tight engagement with the side member 23 where indented, thus effecting a strong and tight locking of the device upon the axle.

From Fig. 1 it will be noted that there is space at 28 for the positioning of the lower holding device at various places on the axle, and the device is shown in that figure as being moved outward or toward the wheels substantially as far as possible. It is desirable to have some adjustment of the spring tension of the shock absorber, and this is provided through the positioning of the lower holding member at various places on the axle as 26. The set screw 27 holds the clamp in any desired position of such adjustment.

Pull strains upon the device as a whole, caused by the vibration or movement toward and away from each other of the parts to which the device is secured, are communicated first to the rods 13 and 16, thence to the respective internal springs 11 and 12, and thence to the external spring. The construction is such that the lighter shocks are absorbed by the internal springs without expanding the external spring; that heavier shocks compress the internal springs to a further extent and cause the outer spring to yield slightly; and that still heavier vibration movements collapse the internal springs entirely and expand the external spring. The result is that resistance to the strains is built up by the springs gradually and on the return movement of the vibrating part the release of the spring pressure is also gradual, and there is always present a spring pressure commensurate in quality and amount with the strain. The construction provides also that the advantage of the auxiliary springs is had without increasing the length of the article as a whole, and is such also that for the heavier shocks the pull strains are applied positively to the outer and heavier spring. I preferably apply the inner springs in such manner that their spiral lines cross those of the outer spring to avoid any possibility of interference or catching one with the other.

While I have illustrated these improvements in a highly advantageous form, I contemplate as being included in the present invention all such changes, modifications and departures from what is specifically illustrated and described as fall within the scope of the appended claims.

I claim:

1. In a shock absorber of the character described, the combination of an external coiled expansion spring, a pair of internal coiled compression springs housed by the external spring and having their respective outer ends closely adjacent to and in holding relation to the respective end portions of the external spring, means including a pull rod extending through each internal spring and beyond the respective ends of the external spring for applying compression strains to the respective compression springs and expansion strains to the expansion spring through the compression springs, and means at the outer end of each of said rods for holding the rods respectively to external bodies having relative motion away from and toward each other.

2. In a shock absorber of the character described, the combination of shock absorbing means including a spring and a part extending therefrom for communicating strains from the axle of a vehicle to the spring, said part having an opening at the end thereof for a bolt, and a clamping device for holding the structure to the axle of a vehicle, said clamping means including a pair of clamping members having portions facing each other and apertured to receive a bolt to hold said part between them and on such bolt, a bolt extending through said members and part, said clamping members being formed to provide a space beyond the bolt to receive the axle, one of said members extending across said space and normally below the axle and having its free end formed to hold the other of said members against movement laterally away from the axle when the device is normally in use.

3. The combination of claim 2 hereof in which there is also a set screw passing through one of said members so as to engage the axle.

4. The combination of claim 2 hereof in which there is also a set screw passing through the one of said members which extends across the space normally below the axle, the set screw being located to engage the side of the axle.

5. In a shock absorber of the character described, the combination of shock absorbing means including a coiled spring and a pull-rod extending therefrom for communicating strains to an external body, said pull-rod being formed with a hook to hook upon the external body, and a cross-bar apertured to receive and being positioned on both arms of the hook, and means for holding said cross-bar on both arms of the hook for ready separability from the freed end of the hook.

6. The combination of claim 5 hereof in which the means for holding the cross-bar comprise a nut threaded on the free end of the hook.

ORVILLE G. HALLIBURTON.